US 8,893,036 B1

(12) United States Patent
Wabyick

(10) Patent No.: US 8,893,036 B1
(45) Date of Patent: Nov. 18, 2014

(54) DISPLAY REGION SCROLLING

(75) Inventor: Daniel A. Wabyick, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1128 days.

(21) Appl. No.: 12/565,877

(22) Filed: Sep. 24, 2009

(51) Int. Cl.
*G06F 3/00* (2006.01)
*G06F 9/00* (2006.01)
*G06F 17/00* (2006.01)

(52) U.S. Cl.
USPC ............ 715/786; 715/785; 715/787; 715/830

(58) Field of Classification Search
CPC . G06F 3/0485; G06F 2216/07; G06F 9/4443; G06F 8/34; G06F 3/0481; G06F 3/0482; G06F 8/38; G06F 3/04847; H04N 1/00389; H04N 1/00411
USPC ......... 715/784, 785, 786, 787, 864, 865, 762, 715/763, 765, 830
See application file for complete search history.

(56) References Cited

U.S. PATENT DOCUMENTS

| | | | |
|---|---|---|---|
| 6,857,128 B1* | 2/2005 | Borden et al. | 725/39 |
| 7,543,278 B2* | 6/2009 | Klementiev | 717/125 |
| 2006/0075358 A1* | 4/2006 | Ahokas | 715/784 |
| 2007/0033517 A1* | 2/2007 | O'Shaughnessy et al. | 715/501.1 |
| 2007/0132789 A1* | 6/2007 | Ording et al. | 345/684 |
| 2007/0252851 A1* | 11/2007 | Ogata et al. | 345/619 |
| 2007/0277126 A1* | 11/2007 | Park et al. | 715/866 |
| 2008/0042984 A1* | 2/2008 | Lim et al. | 345/173 |
| 2009/0219304 A1* | 9/2009 | Martin et al. | 345/684 |

* cited by examiner

*Primary Examiner* — Tadeese Hailu
*Assistant Examiner* — Anita D Chaudhuri
(74) *Attorney, Agent, or Firm* — Kilpatrick Townsend & Stockton LLP

(57) ABSTRACT

Methods and apparatus provide for a Region Scroller. The Region Scroller renders a view of at least a portion of a set of headers, where each header is associated with a respective, expandable-collapsible (E-C) display region The Region Scroller identifies a newly-selected header based on an extent of directional input and modifies the view to include concurrent presentation of (i) the newly-selected header and (ii) an E-C display region in an expanded state, where the E-C display region is associated with the newly-selected header.

18 Claims, 13 Drawing Sheets

DISPLAY REGION SCROLLING

BACKGROUND

Conventional computerized devices, such as personal computers, laptop computers, and the like utilize a graphical user interface in applications, such as operating systems, and graphical editors (i.e., web page editors, document editors, etc.) that enable users to quickly provide input and create documents and/or projects using "What You See Is What You Get" (WYSIWYG) technology. In general, using a graphical user interface, a user operates an input device such as a mouse or keyboard to manipulate graphical objects on a computer display. The user can operate an input device such as a mouse to move a mouse pointer onto a scroll bar to manipulate the scroll bar.

Certain conventional software applications operate within a computer system to allow users to manipulate a scroll bar to view and browse content. For example, in a word processing application, a document may consist of multiple pages, yet the word processing application's current settings provide a view of a single page at a time. In order to view other pages, a user can manipulate a scroll bar downwards to view pages that occur after the currently visible page—or manipulate the scroll bar upwards to view pages that occur before the currently visible page. In another example, a current view of a browser application may not be big enough to create a complete view of an entire web page. In order to view all the web content presented on the web page, the user can manipulate the browser application's scroll bar upwards and downwards or left and right to view various portions of the web page.

BRIEF DESCRIPTION

Current applications that offer conventional scroll bars suffer from a variety of deficiencies. Specifically, scroll bars are completely separate from any kind of selection functionality. Thus, if a user browses a document via a conventional scroll bar, the scroll bar allows the user to only change which section of the document the user is currently viewing. The conventional scroll bar does not use characteristics of the user's scrolling action to trigger actions that select and access different regions of selectable content.

Techniques discussed herein significantly overcome the deficiencies of conventional scroll bars such as those discussed above. As will be discussed further, certain specific embodiments herein are directed to a Region Scroller.

Generally, the techniques disclosed herein provide a computer system and/or software in the form of a Region Scroller that renders a view of a portion of a set of headers—where each header is associated with a corresponding expandable-collapsible display region. The Region Scroller identifies a newly-selected header based on the extent (i.e. totality of characteristics) of directional input, such as the motion of a finger being dragged across a surface of a display screen.

Based on the extent of the directional input, the Region Scroller identifies a newly-selected header and scrolls through the set of headers in order to present the newly-selected header in the view. The Region Scroller expands an expandable-collapsible (E-C) display region associated with the newly-selected header and presents the expanded E-C display region in the view as well. Thus, the Region Scroller provides a user the ability to browse through multiple headers—and to trigger presentation of various display regions—based on a simple motion (i.e. finger drag, scroll wheel movement). The Region Scroller thereby greatly simplifies the workflow of browsing and selecting content items.

Specifically, in various embodiments, a computer implemented system, methods and apparatus provide a Region Scroller that renders a view of at least a portion of a set of headers, where each header is associated with a respective, expandable-collapsible (E-C) display region The Region Scroller identifies a newly-selected header based on an extent of directional input and modifies the view to include concurrent presentation of (i) the newly-selected header and (ii) an E-C display region in an expanded state, where the E-C display region is associated with the newly-selected header. It is understood that an expandable-collapsible display region can provide a listing of content items, selectable content items, application functionalities, and/or content feed data, such as content from a Real Simple Syndication (RSS) feed.

In one embodiment, the Region Scroller applies a highlighting effect to a first header included in the portion of the set of headers currently presented in the view. The highlighting effect represents an update of a content feed(s) displayable within a first E-C display region—where the first E-C display region is (i) associated with the first header and (ii) currently in a collapsed state. The Region Scroller detects selection of the first header.

The Region Scroller identifies a second E-C display region presented in the view—where the second E-C display region is in an expanded state and is associated with a previously-selected header that is also presented in the view. The Region Scroller transitions the second E-C display region from the expanded state to the collapsed state. As the second E-C display region collapses, the Region Scroller gradually transitions the first E-C display region (which is associated with the first header) from the collapsed state to the expanded state. In the view, the Region Scroller presents the updated content feed within the second E-C display region and terminates the highlighting effect.

In another embodiment, each header can be configured to represent a source of e-mail messages. For example, a user of an e-mail application (which includes the Region Scroller) can configure each header to represent a person who frequently sends e-mail to the user. Each E-C display region—when expanded and presented in the view—can display a listing of email messages received from the person that is currently identified by that E-C display region's header.

In yet another embodiment, it is noted that each of the multiple headers can correspond with a distinct computer application, which can be accessed via a E-C display region. For example, a first header corresponds with a first E-C display region—which is a web browser. A second header corresponds with a second E-C display region—which is an Instant Message chat session. A third header corresponds with a third E-C display region—which is a media player.

Other embodiments disclosed herein include software programs to perform the steps and operations summarized above and disclosed in detail below. One such embodiment comprises a computer program product that has a computer-readable medium (e.g., tangible computer-readable medium) including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in software and hardware such as those manufactured by Adobe Systems Incorporated of San Jose, Calif., U.S.A., herein after referred to as "Adobe" and "Adobe Systems."

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this Brief Description section herein does not specify every embodiment and/or incrementally novel aspect of the present disclosure or claimed invention. Instead, this Brief Description only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for a Region Scroller, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

Generally, the techniques disclosed herein provide a computer system and/or software in the form of a Region Scroller that renders a view of a portion of a set of headers. Each header (in the entire set of headers) is associated with a respective, expandable-collapsible (E-C) display region. Some headers are presented in the view, while some headers are not included in the view. Additionally, in the portion of the set of headers currently presented in the view, a previously-selected header is displayed along with its corresponding E-C display region—which is presented in an expanded state.

The Region Scroller defines a scroll position for each header. The Region Scroller receives directional input, such as a finger dragging across the surface of the display screen or the movement of a scroll wheel. Based on characteristics of the directional input, the Region Scroller calculates a scroll factor to locate a scroll position measured from the scroll position of the previously-selected header.

The Region Scroller identifies a newly-selected header as a header currently occupying a scroll position identified according to the scroll factor. The Region Scroller collapses the E-C region that corresponds with the previously-selected header, and modifies the view to include concurrent presentation of (i) the newly-selected header and (ii) an E-C display region in an expanded state, where the newly-expanded E-C display region is associated with the newly-selected header.

Thus, the Region Scroller allows for a sophisticated scrolling and browsing experience driven by simple directional movements. Based on the speed, length of time, and direction of directional input, the Region Scroller browses through a set of multiple headers and triggers the expansion and/or collapse of respective E-C display regions.

It is understood that a set of headers can include any number of individual, selectable headers and a portion of headers can also include any number of headers that is less than the total number of headers in the set of headers.

Figure 1:
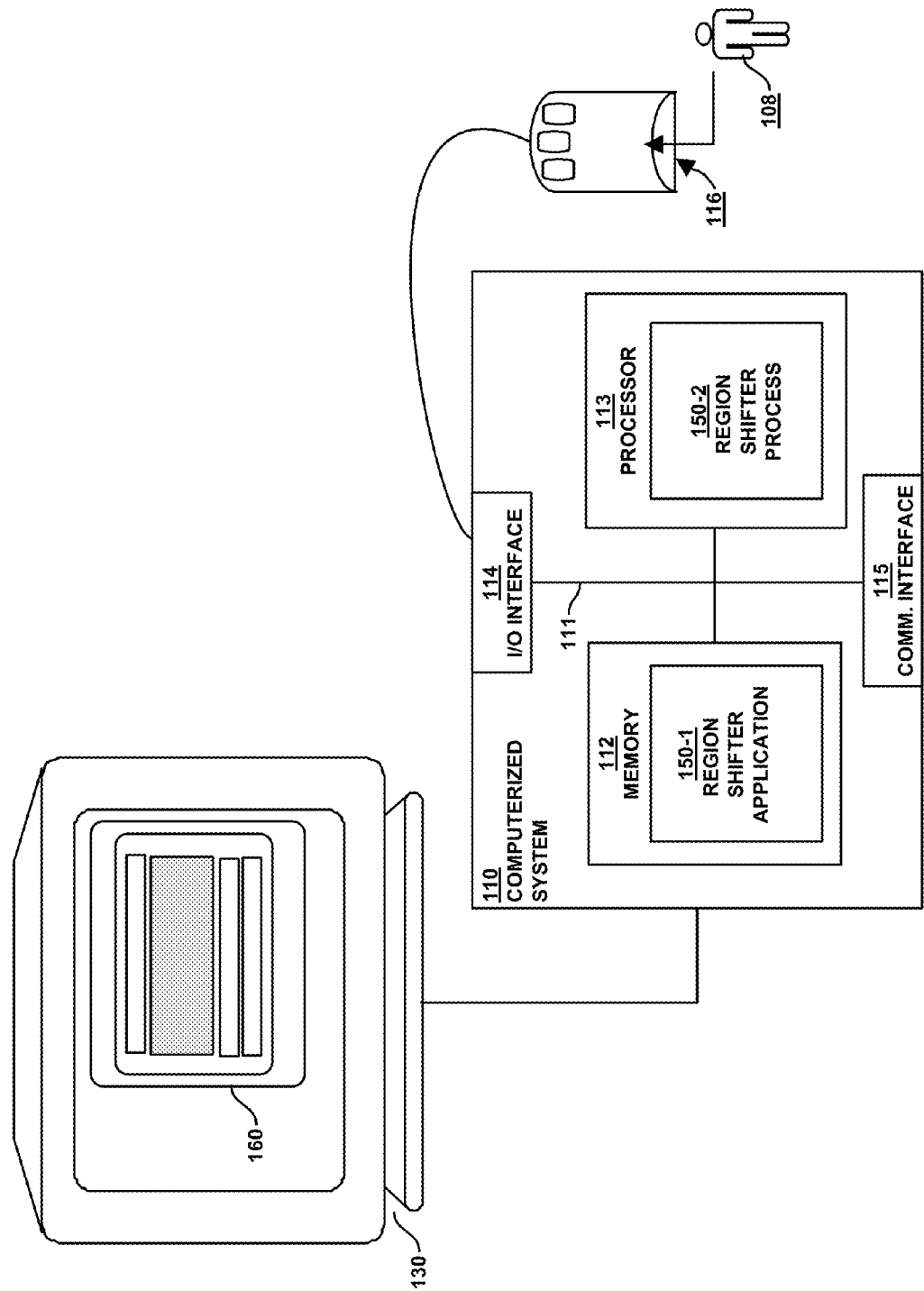
FIG. 1 is an example block diagram illustrating an architecture of a computer system that executes, runs, interprets, operates or otherwise performs a Region Scroller application and/or Region Scroller process according to embodiments herein.

FIG. 1 is an example block diagram illustrating an architecture of a computer system 110 that executes, runs, interprets, operates or otherwise performs a Region Scroller application 150-1 and/or Region Scroller process 150-2 (e.g. an executing version of a Region Scroller 150 as controlled or configured by user 108) according to embodiments herein.

Note that the computer system 110 may be any type of computerized device such as a personal computer, a client computer system, workstation, portable computing device, console, laptop, network terminal, etc. This list is not exhaustive and is provided as an example of different possible embodiments.

In addition to a single computer embodiment, computer system 110 can include any number of computer systems in a network environment to carry the embodiments as described herein.

As shown in the present example, the computer system 110 includes an interconnection mechanism 111 such as a data bus, motherboard or other circuitry that couples a memory system 112, a processor 113, an input/output interface 114, and a display 130. If so configured, the display can be used to present a graphical user interface of the Region Scroller 150 to user 108. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system. As mentioned above, depending on the embodiment, the Region Scroller application 150-1 and/or the Region Scroller process 150-2 can be distributed and executed in multiple nodes in a computer network environment or performed locally on a single computer.

During operation of the computer system 110, the processor 113 accesses the memory system 112 via the interconnect 111 in order to launch, run, execute, interpret or otherwise perform the logic instructions of the Region Scroller application 150-1. Execution of the Region Scroller application 150-1 in this manner produces the Region Scroller process 150-2. In other words, the Region Scroller process 150-2 represents one or more portions or runtime instances of the Region Scroller application 150-1 (or the entire application 150-1) performing or executing within or upon the processor 113 in the computerized device 110 at runtime.

The Region Scroller application 150-1 may be stored on a computer readable medium (such as a floppy disk), hard disk, electronic, magnetic, optical, or other computer readable medium. It is understood that embodiments and techniques discussed herein are well suited for other applications as well.

Those skilled in the art will understand that the computer system 110 may include other processes and/or software and hardware components, such as an operating system. Display 130 need not be coupled directly to computer system 110. For example, the Region Scroller application 150-1 can be executed on a remotely accessible computerized device via the communication interface 115.

The display 130 presents a rendered graphical user interface 160 that provides a view of a stack of multiple headers. The Region Scroller presents a E-C display region displayed in the stack and in between two of the multiple headers—where the E-C display region is associated to one of the multiple headers.

FIG. 1 is an example block diagram illustrating an architecture of a computer system that executes, runs, interprets, operates or otherwise performs a Region Scroller application and/or Region Scroller process according to embodiments herein.

FIGS. 2, 4, 7 and 11-13 illustrate flowcharts of processing of various embodiment of the Region Scroller 150. FIGS. 3, 5, 6, 8, 9, 10 show examples of block diagrams illustrating a graphical user interface 160 that demonstrates the processing described in the flowcharts. The rectangular elements in flowcharts 200, 400, 700, 1100, 1200 and 1300 (in FIGS. 2, 4, 7, 11-13) denote "processing blocks" and represent computer software instructions or groups of instructions upon a computer readable medium. Additionally, the processing blocks represent steps performed by hardware such as a computer, digital signal processor circuit, application specific integrated circuit (ASIC), etc. As the processing in the flowcharts 200, 400, 700, 1100, 1200 and 1300 is described, reference will be made to FIGS. 3, 5, 6, 8-10 that show examples of this processing.

Flowcharts 200, 400, 700, 1100, 1200 and 1300 do not necessarily depict the syntax of any particular programming language. Rather, flowcharts 200, 400, 700, 1100, 1200 and 1300 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 2:
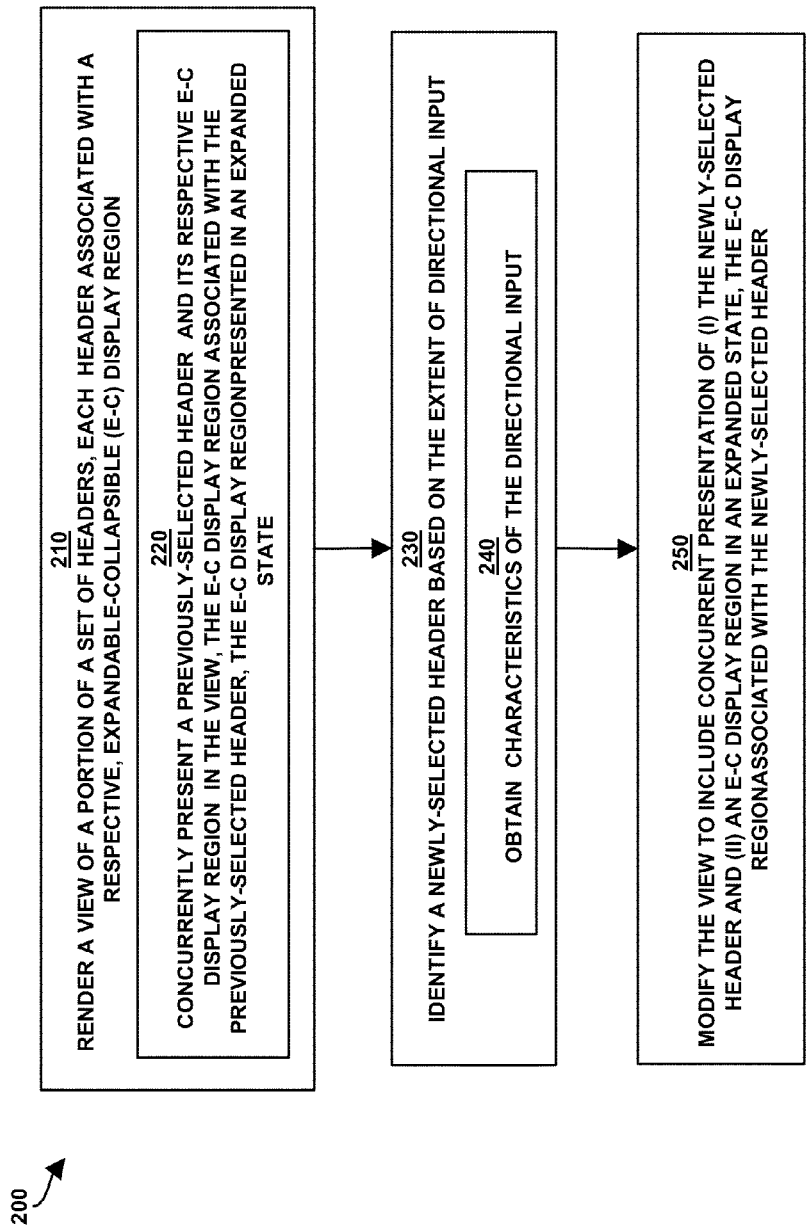
FIG. 2 is a flowchart of an example of processing steps performed by a Region Scroller to include a previously-selected header and a corresponding expanded E-C display region as part of a portion of a set of headers currently presented in a rendered view according to embodiments herein.
Figure 3:
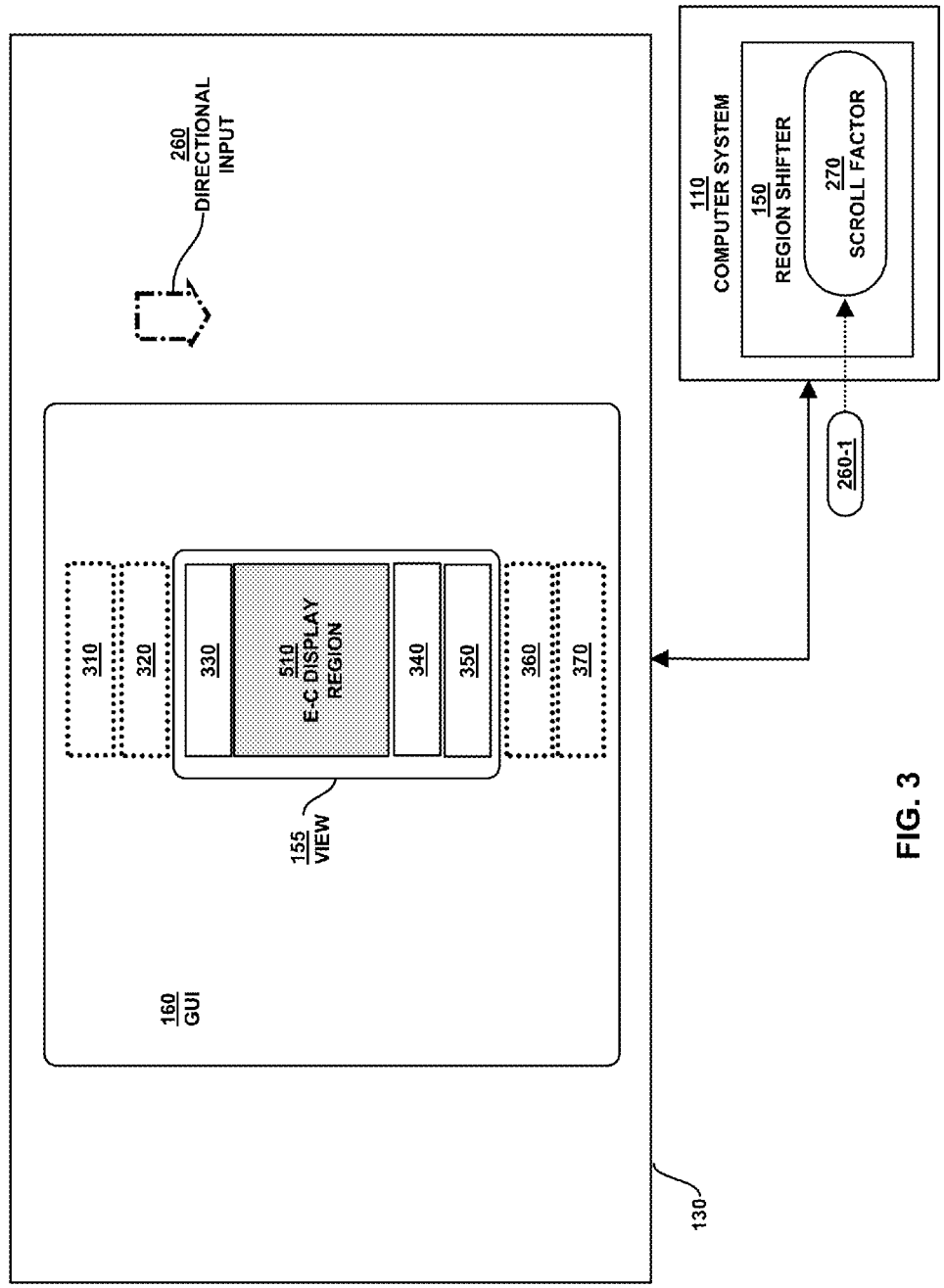
FIG. 3 is an example block diagram of a Region Scroller including a previously-selected header and a corresponding expanded E-C display region as part of a portion of a set of headers currently presented in a rendered view according to embodiments herein.

FIG. 2 is a flowchart 200 of an example of processing steps performed by a Region Scroller 150 to include a previously-selected header and a corresponding expanded E-C display region as part of a portion of a set of headers currently presented in a rendered view according to embodiments herein. FIG. 2 references the example block diagrams of FIGS. 3, 5-6.

In flowchart 200, at step 210, the Region Scroller 150 renders a view 155 of a portion 330, 340, 350 of a set of headers 310, 320, 330, 340, 350, 360, 370. Each header 310, 320, 330, 340, 350, 360, 370 is associated with a respective, expandable-collapsible (E-C) display region.

At step 220, the Region Scroller 150 concurrently presents a previously-selected header 330 and an expanded E-C display region 510 associated with the previously-selected header 330. E-C display regions associated with the other headers 340, 350 presented in the view 155 are in a collapsed state and are not visible. Headers 310, 320, 360, 370 are not included in the portion of the set of headers currently presented in the view 155 and are not visible in the graphical user interface (GUI) 160 or the view 155.

At step 230, the Region Scroller 150 identifies a newly-selected header 340 based on the extent of directional input 260.

At step 240, the Region Scroller 150 obtains characteristics 260-1 of the directional input 260, and uses the speed of the directional input 260, the direction of the directional input 260, and the length of time of the directional input 260. to calculate a scroll factor 270. The Region Scroller 150 utilizes the scroll factor 270 to identify a newly-selected header. For example, the scroll factor 270 indicates a number of scroll positions that is measured from the scroll position currently occupied by the previously-selected header 330.

At step 250, the Region Scroller 150 modifies the view 155 to include concurrent presentation of the newly-selected header 340 and an E-C display region 520 in an expanded state where the expanded E-C display region 520 is associated with the newly-selected header 340.

Figure 4:
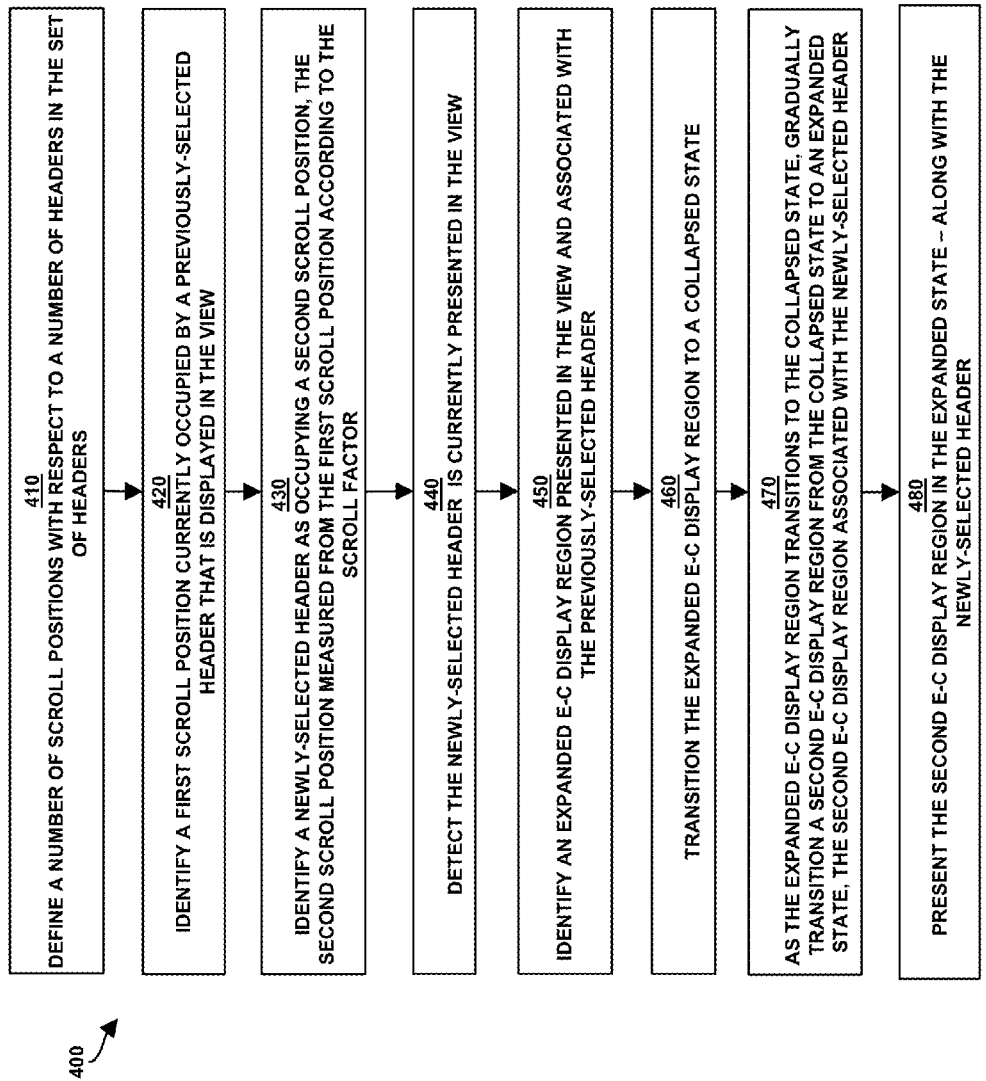
FIG. 4 is a flowchart of an example of processing steps performed by a Region Scroller to modify a view to include a newly-selected header and a corresponding expanded E-C display region as part of a portion of a set of headers currently presented in a rendered view according to embodiments herein.
Figure 5:
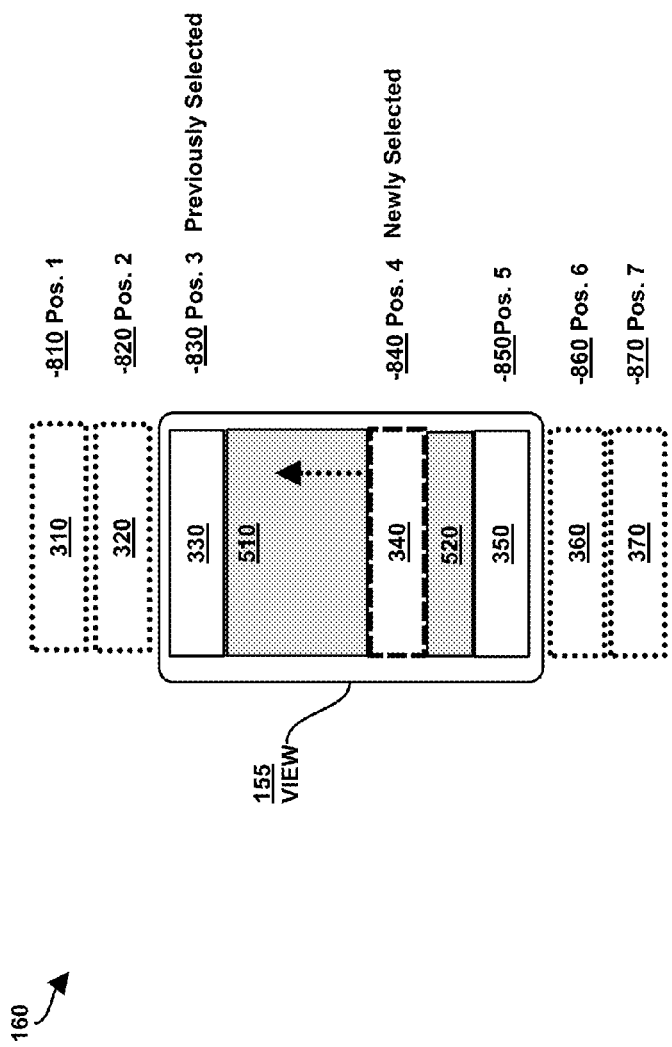
FIG. 5 is an example block diagram of a Region Scroller modifying a view to include a newly-selected header and a corresponding expanded E-C display region as part of a portion of a set of headers currently presented in a rendered view according to embodiments herein.

FIG. 4 is a flowchart 400 of an example of processing steps performed by a Region Scroller to modify a view to include a newly-selected header and a corresponding expanded E-C display region as part of a portion of a set of headers currently presented in a rendered view according to embodiments herein. FIG. 4 references the example block diagram of FIG. 5.

In flowchart 400, at step 410, the Region Scroller 150 defines a number of scroll positions 810, 820, 830, 840, 850, 860, 870 with respect to a number of headers in the set of headers 310, 320, 330, 340, 350, 360, 370. It is understood that while the scroll positions 810, 820, 830, 840, 850, 860, 870 are illustrated in the block diagrams, various embodiments of the Region Scroller 150 do not actually display the scroll positions 810, 820, 830, 840, 850, 860, 870 in the graphical user interface (GUI) 160. Thus, the scroll positions 810, 820, 830, 840, 850, 860, 870 are conceptual as opposed to being visible to a user.

At step 420, the Region Scroller 150 identifies a first scroll position 830 currently occupied by a previously-selected header 330 that is displayed in the view 155.

At step 430, the Region Scroller 150 identifies a newly-selected header 340 as occupying a second scroll position 840, where the second scroll position 840 is measured from the first scroll position 830 according to the scroll factor 360.

At step 440, the Region Scroller 150 detects the newly-selected header 340 is currently presented in the view 155. For example, the Region Scroller 150 used the extent of the directional input 350 to determine a scroll factor 260, which indicated the Region Scroller 150 will only move down one scroll position from the previously-selected header 330. The Region Scroller 150 identifies a newly-selected header 340 according to the scroll factor 360.

At step 450, the Region Scroller 150 identifies an expanded E-C display region 510 that is presented in the view 155 and is associated with the previously-selected header 330. Since the Region Scroller 150 is scrolling to locate a newly-selected header located one scroll position down from the previously-selected header 330, the E-C display region 510 associated with the previously-selected header 330 will have to be collapsed and hidden from view. Thus, at step 460, the Region Scroller 150 transitions the expanded E-C display region 510 to a collapsed state.

At step 470, as the expanded E-C display region 510 transitions to the collapsed state, the Region Scroller 150 gradually transitions a second E-C display region 520 from the collapsed state to an expanded state, where the second E-C display region 520 is associated with the newly-selected header 340.

At step 480, in the view 155, the Region Scroller 150 presents the second E-C display region 520 in the expanded state—along with the newly-selected header 340.

Figure 6:
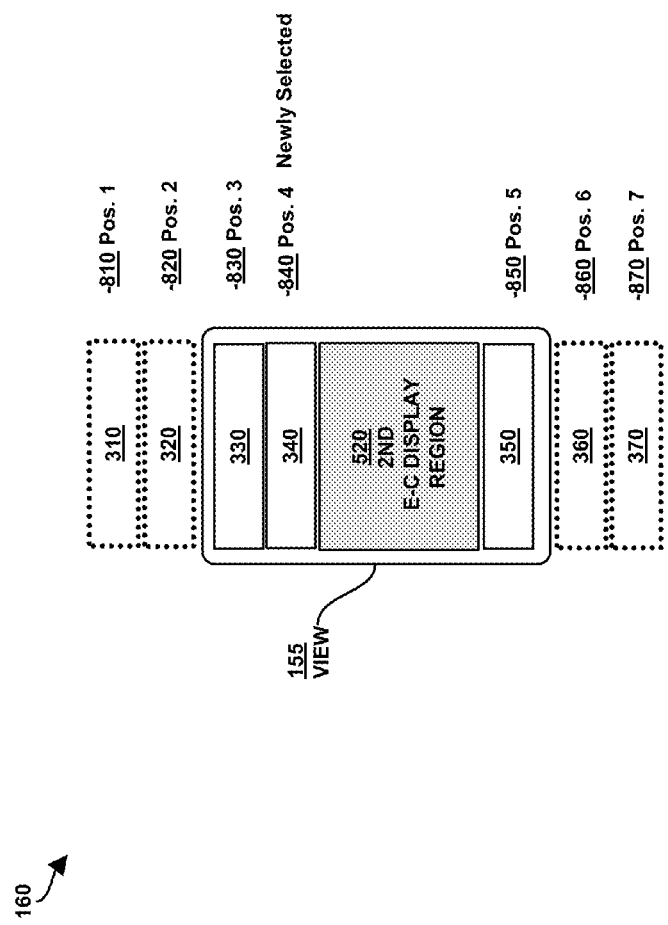
FIG. 6 is an example block diagram of a Region Scroller including a newly-selected header and a corresponding expanded E-C display region as part of a portion of a set of headers currently presented in a rendered view according to embodiments herein.

FIG. 6 is an example block diagram of a Region Scroller including a newly-selected header and a corresponding expanded E-C display region as part of a portion of a set of headers currently presented in a rendered view according to embodiments herein.

The Region Scroller 150 concurrently presents a newly-selected header 340 and its respective E-C display region 520. The E-C display region 520 associated with the newly-selected header 340 is presented in the view 155 in an expanded state. E-C display regions associated with the other headers 330, 350 presented in the view 155 are in a collapsed state and are not visible. In addition, the Region Scroller 150 maintains headers 310, 320, 360, 370 at respective scroll positions 810, 820, 860, 870—but such headers 310, 320, 360, 370 are not currently included in the view 155.

Figure 7:
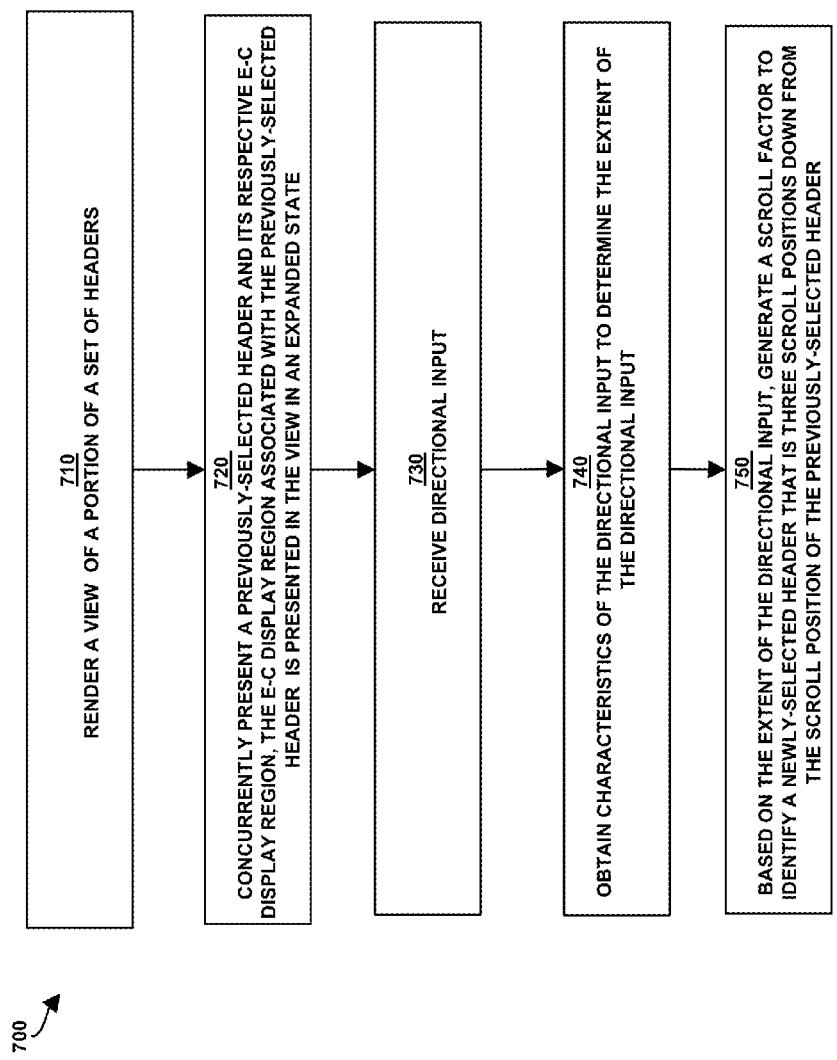
FIG. 7 is a flowchart of an example of processing steps performed by a Region Scroller to modify a view to include a newly-selected header and a corresponding expanded E-C display region as part of a new portion of a set of headers to be presented in a rendered view according to embodiments herein.
Figure 8:
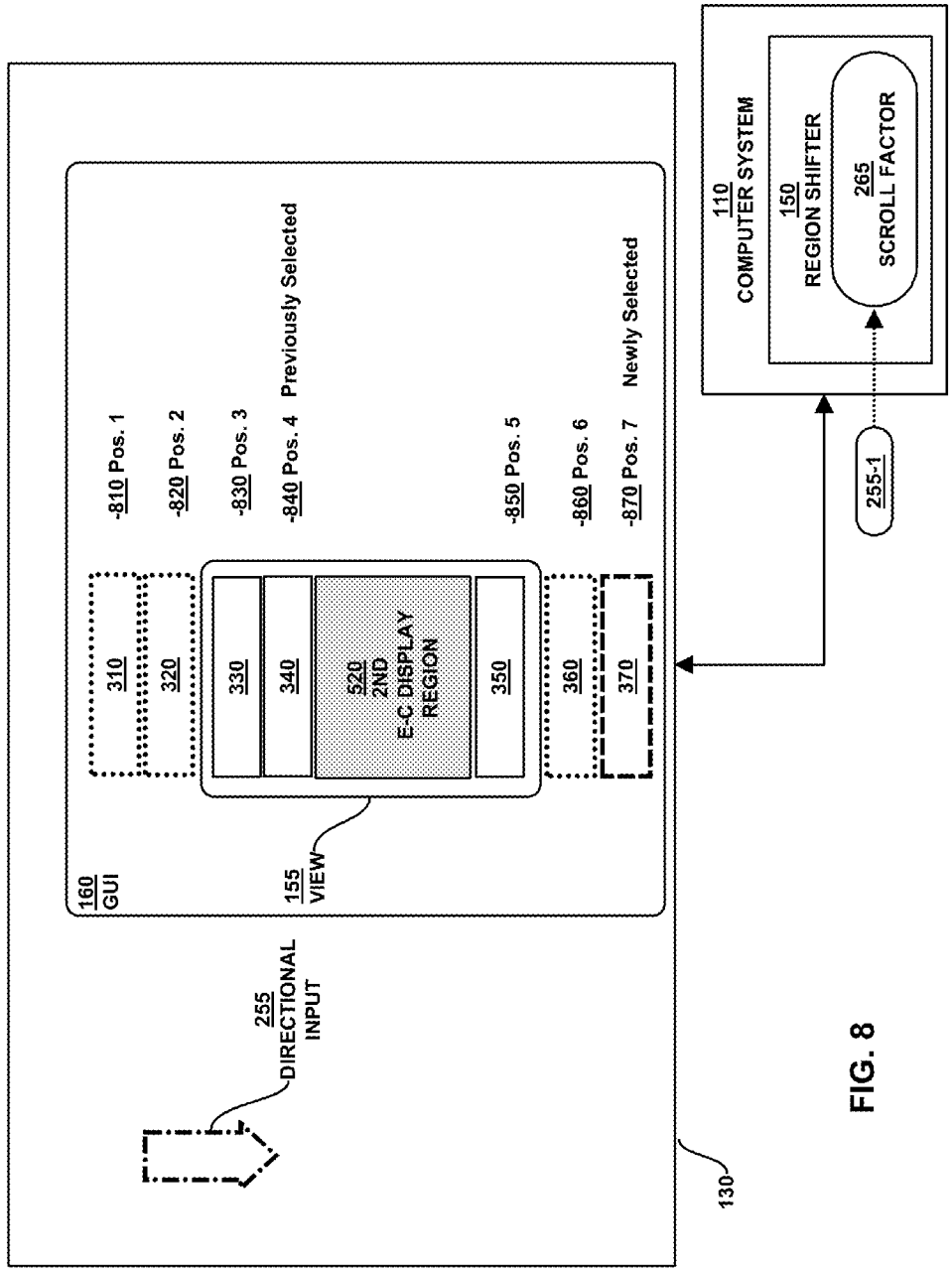
FIG. 8 is an example block diagram of a Region Scroller modifying a view to include a newly-selected header and a corresponding expanded E-C display region as part of a new portion of a set of headers to be presented in a rendered view according to embodiments herein.

FIG. 7 is a flowchart 700 of an example of processing steps performed by a Region Scroller to modify a view to include a newly-selected header and a corresponding expanded E-C display region as part of a new portion of a set of headers to be presented in a rendered view according to embodiments herein. FIG. 7 references the example block diagram of FIG. 8.

In flowchart 700, at step 710, the Region Scroller 150 renders a view 155 of a portion 330, 340, 350 of a set of headers 310, 320, 330, 340, 350, 360, 370.

At step 720, the Region Scroller 150 concurrently presents a previously-selected header 340 (i.e. the newly-selected header from FIGS. 2-6) and its respective E-C display region 520. The E-C display region 520 associated with the previously-selected header 340 is presented in the view 155 in an expanded state. E-C display regions associated with the other headers 330, 350 presented in the view 155 are in a collapsed state and are not visible.

At step 730, the Region Scroller 150 receives directional input 255, such as a finger dragged upon the surface of the display screen 130 or movement of an input device control (e.g. scroll wheel).

At step 740, the Region Scroller 150 obtains characteristics 255-1 of the directional input 255 to determine the extent of the directional input 255—such as the speed of the directional input 255, the direction of the directional input 255, and the length of time of the directional input 255 and calculates a scroll factor 365.

At step 750, based on the extent of the directional input 255, the Region Scroller 150 generates a scrolls factor 365 to use to identify a newly-selected header 370 that is three scroll positions down from the scroll position 840 of the previously-selected header 340.

Figure 9:
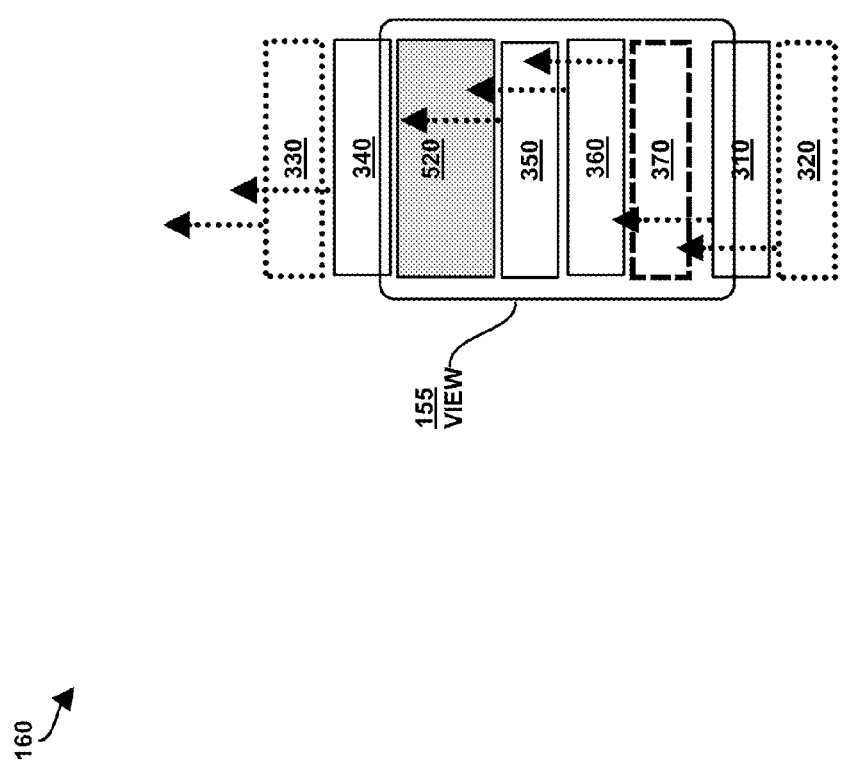
FIG. 9 is an example block diagram of a Region Scroller presenting an animated scroll amongst portion of a set of headers according to embodiments herein.

FIG. 9 is an example block diagram of a Region Scroller 150 presenting an animated scroll amongst portion of a set of headers according to embodiments herein.

The Region Scroller 150 identifies a newly-selected header 370, which is not included in the portion 330-350 of the set of headers currently presented in the view 155. In order to concurrently present the newly-selected header 370 and its corresponding E-C display region 530 in an expanded state, the Region Scroller 150 determines a new portion 360, 370, 310 of the set of headers—placing the newly-selected header 370 at the scroll position 840 of the previously-selected header 340.

The Region Scoller 150 presents an animated scroll through the set of headers 310, 320, 330, 340, 350, 360, 370 until the newly-selected header 370 reaches the scroll position 840 last held by the previously-selected header 340. During the animated scroll, the Region Scoller 150 collapses the E-C display region 520 associated with the previously-selected header 340 and gradually expands the E-C display region 530 associated with the newly-selected header 370. In another embodiment, the Region Scroller 150 keeps the E-C display region 530 associated with the newly-selected header 370 in a collapsed state until the newly-selected header 370 reaches the scroll position 840 last held by the previously-selected header 340, Once the newly-selected header 370 occupies the scroll position 840, the Region Scroller 150 allows for the E-C display region 530 associated with the newly-selected header 370 to transition from a collapsed state to an expanded state in the view 155.

Figure 10:
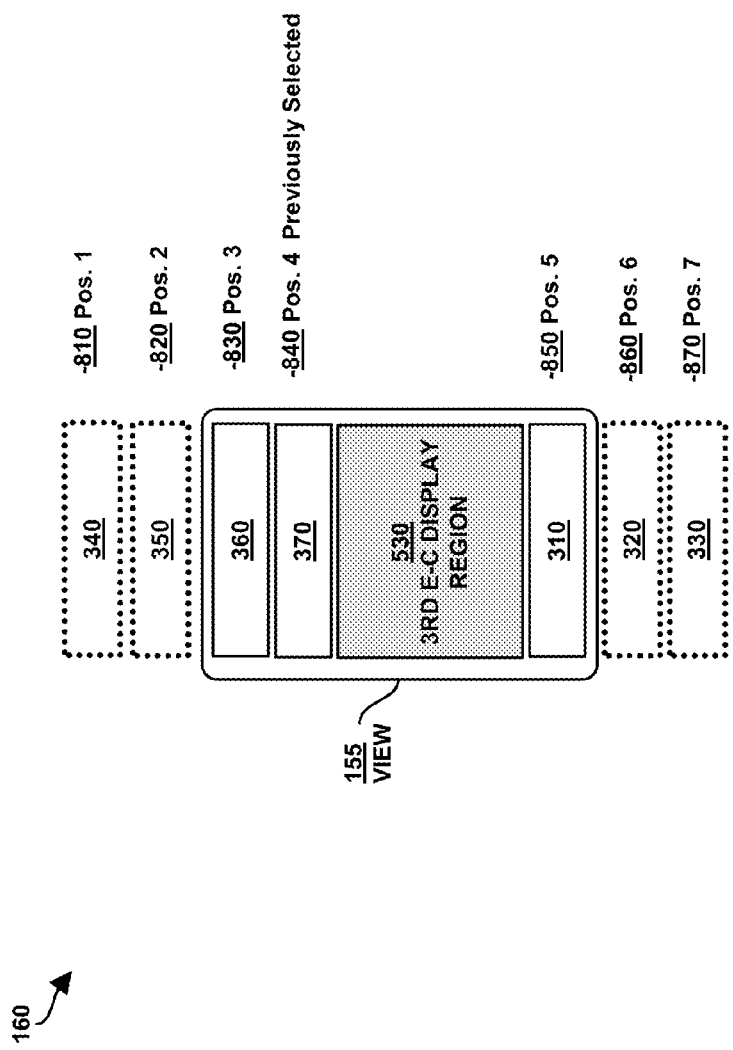
FIG. 10 is an example block diagram of a Region Scroller including a previously-selected header and a corresponding expanded E-C display region as part of a portion of a set of headers currently presented in a rendered view according to embodiments herein.

FIG. 10 is an example block diagram of a Region Scroller 150 including a previously-selected header and a corresponding expanded E-C display region as part of a portion of a set of headers currently presented in a rendered view according to embodiments herein.

Upon termination if the animated scroll, the Region Scroller 150 concurrently presents a previously-selected header 370 (which was the newly-selected header 370 in FIG. 9) and its respective E-C display region 530 in a view 155. The E-C display region 530 associated with the previously-selected header 370 is presented in the view 155 in an expanded state.

Those E-C display regions associated with the other headers 360, 310 presented in the view 155 are in a collapsed state and are not visible.

Headers 320, 330, 340, 350 are not included in the new portion of the set of headers currently presented in the view 155 and are not visible in the GUI 160 or the view 155.

Figure 11:
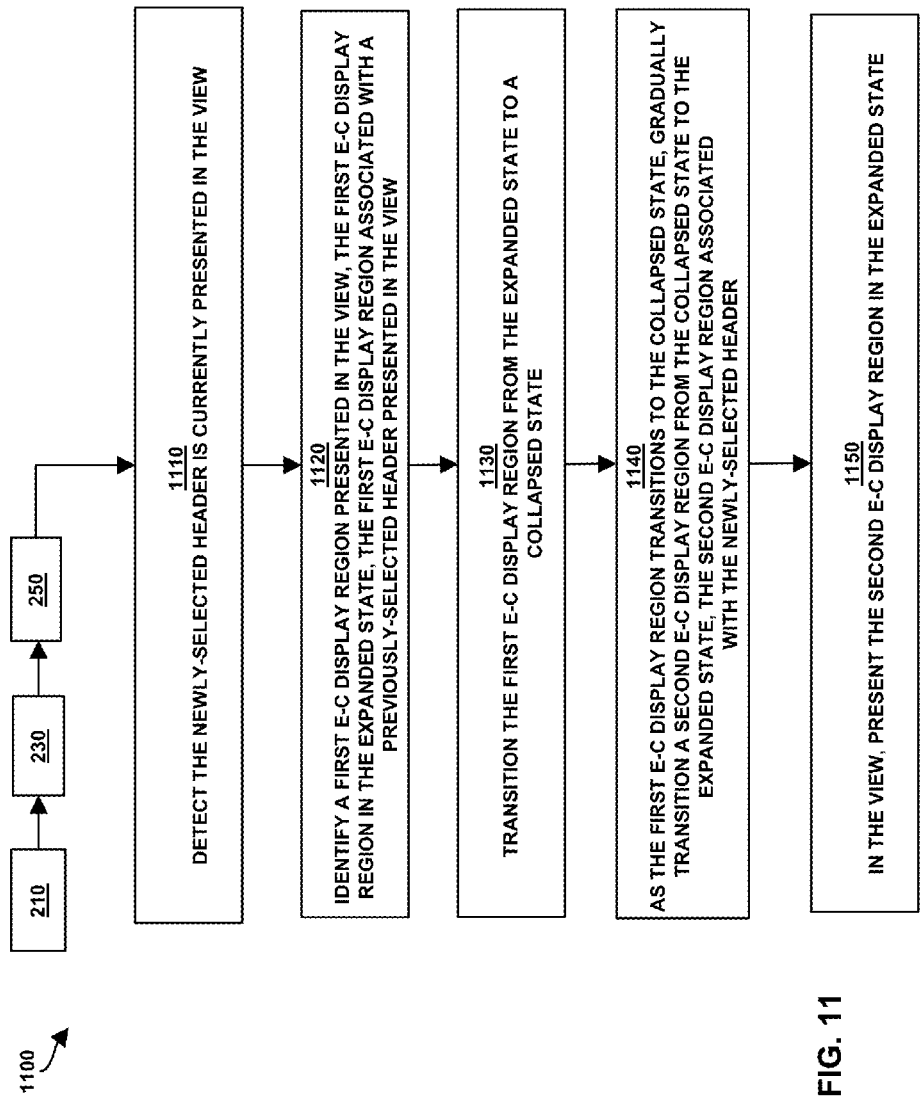
FIG. 11 is a flowchart of an example of processing steps performed by a Region Scroller to expand an E-C display region as another E-C display region collapses according to embodiments herein.

FIG. 11 is a flowchart 1100 of an example of processing steps performed by a Region Scroller to expand an E-C display region as another E-C display region collapses according to embodiments herein. FIG. 11 references the example block diagrams of FIGS. 5-6.

At step 1110, the Region Scroller 150 detects the newly-selected header 340 is currently presented in the view 155.

At step 1120, the Region Scroller 150 identifies a first E-C display region 510 presented in the view 155—where the first E-C display region 510 is displayed in the expanded state and is associated with a previously-selected header 330 presented in the view 155.

At step 1130, the Region Scroller 150 transitions the first E-C display region 510 from the expanded state to a collapsed state.

At step 1140, as the first E-C display region 510 transitions to the collapsed state, the Region Scroller 150 gradually transitions a second E-C display region 520 from the collapsed state to the expanded state—where the second E-C display region 520 is associated with the newly-selected header 340.

At step 1150, in the view 155, the Region Scroller 150 presents the second E-C display region 520 in the expanded state.

Figure 12:
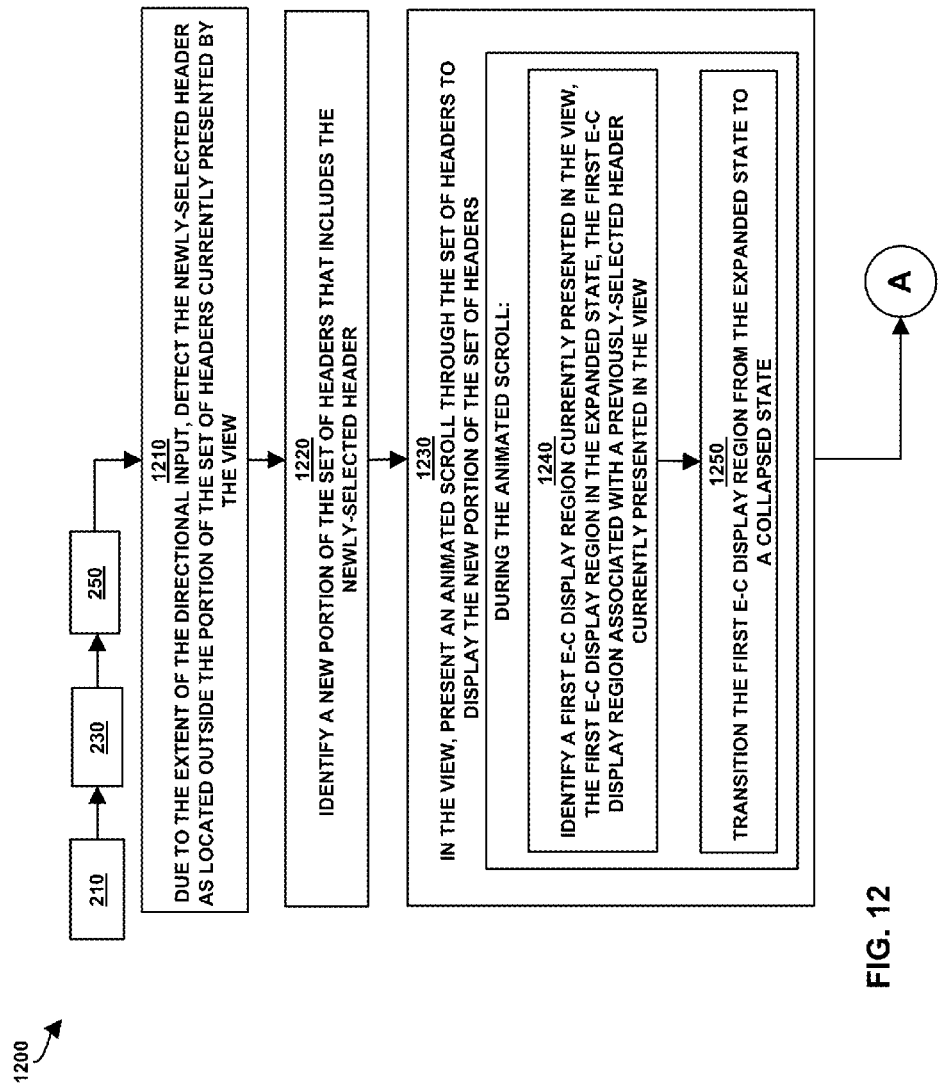
FIG. 12 is a flowchart of an example of processing steps performed by a Region Scroller to identify a newly-selected header located outside the portion of a set of headers currently presented in a view according to embodiments herein.

FIG. 12 is a flowchart 1200 of an example of processing steps performed by a Region Scroller to identify a newly-selected header located outside the portion of a set of headers currently presented in a view according to embodiments herein. FIG. 12 references the example block diagrams of FIGS. 8-10.

At step 1210 due to the extent of the directional input, the Region Scroller 150 detects the newly-selected header 370 as located outside the portion 330, 340, 350 of the set of headers currently presented by the view 155.

At step 1220, the Region Scroller 150 identifies a new portion 360, 370, 310 of the set of headers that includes the newly-selected header 370.

At step 1230, the Region Scroller 150 presents, in the view 155, an animated scroll through the set of headers to display the new portion 360, 370, 310 of the set of headers in the view 155.

During the animated scroll, at step 1240, the Region Scroller 150 identifies a first E-C display region 520 currently presented in the view 155—where the first E-C display 520 region is displayed in the expanded state and is associated with a previously-selected header 340 currently presented in the view 155.

At step 1250, the Region Scroller 150 transitions the first E-C display region 520 from the expanded state to a collapsed state.

Figure 13:
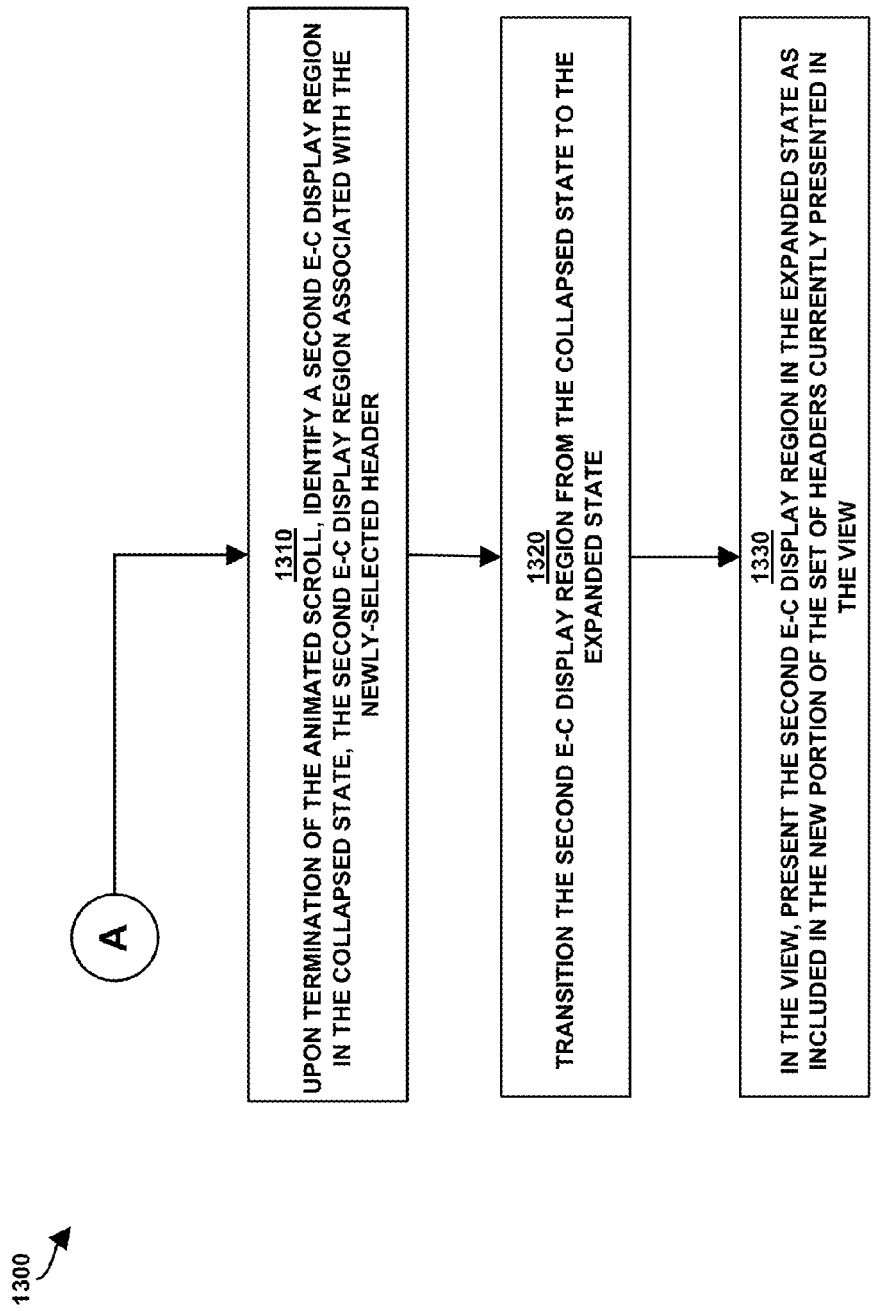
FIG. 13 is a flowchart of an example of processing steps performed by a Region Scroller to terminate an animated scroll and display a new portion of a set of headers in a view according to embodiments herein.

FIG. 13 is a flowchart 1300 of an example of processing steps performed by a Region Scroller to terminate an animated scroll and display a new portion of a set of headers in a view according to embodiments herein. FIG. 13 references the example block diagram of FIG. 10.

At step 1310, upon termination of the animated scroll, the Region Scroller 150 identifyies a second E-C display region in the collapsed state 530 that is associated with the newly-selected header 370.

At step 1320, the Region Scroller 150 transitions the second E-C display region 530 from the collapsed state to the expanded state.

At step 1330, in the view, the Region Scroller 150 presents the second E-C display region 530 in the expanded state as included in the new portion 360, 370, 310 of the set of headers currently presented in the view 155.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the Internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), netbook computer(s), workstation(s) (e.g., Sun, HP), personal digital assistant(s) (PDA(s)), television set-top box(es), handheld device(s) such as cellular telephone(s), laptop(s), camera(s), camcorders(s), handheld computer(s), or another device(s) capable of being integrated with a processor(s) that may operate as provided herein. Accordingly, the devices provided herein are not exhaustive and are provided for illustration and not limitation.

References to "a processor", or "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method comprising:
   rendering a view, on a display screen, of at least a portion of a set of headers, each header in the set of headers associated with a respective, expandable-collapsible (E-C) display region, the view including a previously-selected header and an E-C display region associated with the previously-selected header in an expanded state;
   identifying a first scroll position occupied by the previously-selected header included in the view;
   receiving a directional input to scroll the set of headers;
   determining a scroll factor based at least in part on a speed of the directional input;
   identifying a new scroll position based on the scroll factor, the new scroll position measured from the first scroll position according to the scroll factor;
   selecting a newly-selected header based on the new scroll position, the newly-selected header included in the view occupied by the new scroll position; and
   in response to the selecting, modifying the view including:
      identifying the E-C display region associated with the previously-selected header presented in the view in the expanded state;
         as the E-C display region associated with the previously-selected header transitions to a collapsed state, gradually transitioning a second E-C display region associated with the newly-selected header from a collapsed state to an expanded state; and
      in the view, presenting the second E-C display region associated with the newly selected header in the expanded state.

2. The method as in claim 1, wherein identifying the new scroll position based on the scroll factor includes:
   defining a number of scroll positions with respect to a number of headers in the set of headers, the first scroll position and the new scroll position included in the number of scroll positions.

3. The method as in claim 1, further comprising determining the scroll factor based on characteristics of the directional input including:
   detecting a length of time in which the directional input occurred;
   detecting a direction of the directional input; and
   generating the scroll factor based on (i) the speed of the directional input, (ii) the length of time of the directional input, and (iii) the direction of the directional input.

4. The method as in claim 3, wherein determining the scroll factor based on characteristics of the directional input includes selecting from a group including:
   (i) determining the scroll factor based on characteristics of a dragging motion applied upon a surface of the display screen; and
   (ii) determining the scroll factor based on characteristics of movement of an input device control.

5. The method as in claim 1, wherein modifying the view includes:
   due to the extent of the directional input, detecting the newly-selected header as located outside the portion of the set of headers currently presented by the view;
   identifying a new portion of the set of headers that includes the newly-selected header; and
   in the view, presenting an animated scroll through the set of headers to display the new portion of the set of headers.

6. The method as in claim 5, comprising:
   during the animated scroll identifying the E-C display region associated with the previously selected header currently presented in the view in the expanded state; and
   wherein the modifying the view occurs during the animated scroll.

7. The method as in claim 6, comprising:
   upon termination of the animated scroll, identifying the second E-C display region associated with the newly-selected header; and
   in the view, presenting the second E-C display region associated with the newly-selected header in the expanded state as included in the new portion of the set of headers currently presented in the view.

8. The method as in claim 1, comprising:
   applying a highlighting effect to a first header included in the portion of the set of headers currently presented in the view, the highlighting effect based on an update of at least one content feed displayable within a first E-C display region, the first E-C display region (i) associated with the first header and (ii) currently in a collapsed state;
   detecting selection of the first header;
   as the E-C display region associated with the previously-selected header transitions to the collapsed state, transitioning the first E-C display region from the collapsed state to an expanded state;

in the view, presenting the updated content feed within the first E-C display region; and
terminating the highlighting effect.

9. A non-transitory computer readable medium comprising executable instructions encoded thereon operable on a computerized device to perform processing comprising:
  instructions for rendering a view, on a display screen, of at least a portion of a set of headers, each header in the set of headers associated with a respective, expandable-collapsible (E-C) display region, the view including a previously-selected header and an E-C display region associated with the previously-selected header in an expanded state;
  instructions for identifying a first scroll position occupied by the previously-selected header included in the view;
  instructions for receiving a directional input to scroll the set of headers; instructions for determining a scroll factor based at least in part on a speed of the directional input;
  instructions for identifying a new scroll position based on the scroll factor, the new scroll position measured from the first scroll position according to the scroll factor;
  instructions for selecting, after identifying the new scroll position, a newly-selected header based on the new scroll position, the newly-selected header included in the view occupied by the new scroll position; and
  instructions for, in response to the selecting, modifying the view including:
    identifying the E-C display region associated with the previously-selected header presented in the view in the expanded state;
    as the E-C display region associated with the previously-selected header transitions to a collapsed state, gradually transitioning a second E-C display region associated with the newly-selected header from a collapsed state to an expanded state; and
    in the view, presenting the second E-C display region associated with the newly selected header in the expanded state.

10. The non-transitory computer readable medium as in claim 9, further comprising:
  instructions for determining the scrolling factor based on characteristics of the directional input;
  instructions for detecting a length of time in which the directional input occurred;
  instructions for detecting a direction of the directional input; and
  instructions for generating the scroll factor based on (i) the speed of the directional input, (ii) the length of time of the directional input, and (iii) the direction of the directional input.

11. The non-transitory computer readable medium as in claim 10, wherein determining the scroll factor based on characteristics of the directional input includes selecting from a group including:
  (i) instructions for determining the scroll factor based on characteristics of a dragging motion applied upon a surface of the display screen; and
  (ii) instructions for determining the scroll factor based on characteristics of movement of an input device control.

12. The non-transitory computer readable medium as in claim 9, wherein modifying the view includes:
  instructions for detecting, due to the extent of the directional input, the newly-selected header as located outside the portion of the set of headers currently presented by the view;
  instructions for identifying a new portion of the set of headers that includes the newly-selected header; and
  instructions for presenting, in the view, an animated scroll through the set of headers to display the new portion of the set of headers.

13. The non-transitory computer readable medium as in claim 12, comprising:
  instructions for identifying, during the animated scroll, the E-C display region associated with the previously-selected header currently presented in the view, the first E-C display region in the expanded state; and
  wherein the instructions for modifying the view occurs during the animated scroll.

14. The non-transitory computer readable medium as in claim 13, comprising:
  instructions for identifying, upon termination of the animated scroll, the second E-C display region associated with the newly-selected header in a collapsed state; and
  in the view, presenting the second E-C display region associated with the newly-selected header in the expanded state as included in the new portion of the set of headers currently presented in the view.

15. The non-transitory computer readable medium as in claim 9, comprising:
  instructions for applying a highlighting effect to a first header included in the portion of the set of headers currently presented in the view; the highlighting effect based on an update of at least one content feed displayable within a first E-C display region, the first E-C display region (i) associated with the first header and (ii) currently in a collapsed state;
  instructions for detecting selection of the first header;
  instructions for transitioning the first E-C display region from the collapsed state to an expanded state as the E-C display region associated with the previously selected header transitions to the collapsed state;
  instructions for presenting, in the view, the updated content feed within the first E-C display region; and
  instructions for terminating the highlighting effect.

16. A computer system comprising:
  a processor;
  a memory unit that stores instructions associated with an application executed by the processor; and
  an interconnect coupling the processor and the memory unit, enabling the computer system to execute the application and perform operations of:
    rendering a view, on a display screen, of at least a portion of a set of headers, each header in the set of headers associated with a respective, expandable-collapsible (E-C) display region, the view including a previously-selected header and the E-C display region associated with the previously-selected header in an expanded state; identifying a first scroll position occupied by the previously-selected header included in the view;
    receiving a directional input to scroll the set of headers;
    determining a scroll factor based at least in part on a speed of the directional input;
    identifying a new scroll position based on the scroll factor, the new scroll position measured from the first scroll position according to the scroll factor;
    selecting a newly-selected header based on the new scroll position, the newly-selected header included in the view associated with the new scroll position; and
    in response to the selecting, triggering a modification of the view, the modification comprising:
      identifying the E-C display region associated with the previously-selected header presented in the view in the expanded state;

as the E-C display region associated with the previously-selected header transitions to a collapsed state, gradually transitioning a second E-C display region associated with the newly-selected header from a collapsed state to an expanded state; and in the view, presenting the second E-C display region associated with the newly selected header in the expanded state.

17. The computer system as in claim 16, comprising:

applying a highlighting effect to a first header included in the portion of the set of headers currently presented in the view; the highlighting effect based on an update of at least one content feed displayable within a first E-C display region, the first E-C display region (i) associated with the first header and (ii) currently in a collapsed state;

detecting selection of the first header;

as the E-C display region associated with the previously-selected header transitions to the collapsed state, transitioning the first E-C display region from the collapsed state to an expanded state;

in the view, presenting the updated content feed within the first E-C display region; and terminating the highlighting effect.

18. The computer system as in claim 16, wherein triggering the modification of the view is based in part on the scroll factor and expanding the second E-C display region associated with the newly-selected header is based in part on the new scroll position.

\* \* \* \* \*